United States Patent
Jung et al.

(10) Patent No.: US 12,460,588 B2
(45) Date of Patent: Nov. 4, 2025

(54) ENGINE CONTROL SYSTEM PROVIDED WITH DUAL CONTINUOUSLY VARIABLE VALVE DURATION DEVICE AND METHOD OF GPF FORCIBLE REGENERATION USING THE SAME

(71) Applicants: HYUNDAI MOTOR COMPANY, Seoul (KR); Kia Corporation, Seoul (KR)

(72) Inventors: Jinyoung Jung, Hwaseong-si (KR); Sangyeon Han, Hwaseong-si (KR); Young Nam Kim, Hwaseong-si (KR); You Sang Son, Hwaseong-si (KR); Back Sik Kim, Hwaseong-si (KR); Sangjae Park, Hwaseong-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/951,060

(22) Filed: Nov. 18, 2024

(65) Prior Publication Data

US 2025/0163859 A1  May 22, 2025

(30) Foreign Application Priority Data

Nov. 20, 2023 (KR) .................. 10-2023-0160995

(51) Int. Cl.
*F02D 13/02* (2006.01)
*F01N 3/20* (2006.01)
(Continued)

(52) U.S. Cl.
CPC ....... *F02D 13/0207* (2013.01); *F01N 3/2006* (2013.01); *F02D 41/029* (2013.01);
(Continued)

(58) Field of Classification Search
CPC ................. F02D 13/0207; F02D 41/38; F02D 2200/501; F01N 3/2006; F02P 5/1502; F02P 5/045
See application file for complete search history.

(56) References Cited

U.S. PATENT DOCUMENTS

| | | | | |
|---|---|---|---|---|
| 2003/0230078 A1* | 12/2003 | Yahata | ..................... | F01N 9/002 60/297 |
| 2014/0026873 A1* | 1/2014 | Gehrke | ............... | F02D 41/0025 123/568.11 |

FOREIGN PATENT DOCUMENTS

| | | | | |
|---|---|---|---|---|
| CN | 114882959 A | * | 8/2022 | ............. G16C 20/90 |
| JP | 2005016345 A | * | 1/2005 | |
| JP | 4007085 B2 | * | 11/2007 | ............. F01N 9/002 |

* cited by examiner

*Primary Examiner* — Mark A Laurenzi
*Assistant Examiner* — Kelsey L Stanek
(74) *Attorney, Agent, or Firm* — MORGAN, LEWIS & BOCKIUS LLP

(57) ABSTRACT

An engine control system is provided with a dual continuously variable valve duration (CVVD) device to optimize engine performance. The system includes an engine with a combustion chamber, an intake valve for selectively supplying an air-fuel mixture, an ignition plug for combustion, and an exhaust valve for expelling exhaust gas. The CVVD device adjusts the intake and exhaust valve durations. A turbine positioned downstream of the engine increases exhaust pressure, followed by a warm-up catalyst to preheat the exhaust gas, and a gasoline particulate filter (GPF) to filter soot. A controller, based on vehicle driving conditions, adjusts ignition timing, intake, and exhaust durations. When lambda (λ) is 1, the controller controls exhaust duration to avoid overlap with intake valve timing by retarding exhaust valve opening and advancing exhaust valve closing, thereby (Continued)

maintaining a negative valve overlap period and enhancing GPF regeneration and emissions control.

4 Claims, 9 Drawing Sheets

(51) Int. Cl.
    *F02D 41/02*     (2006.01)
    *F02D 41/38*     (2006.01)
    *F02P 5/04*     (2006.01)
    *F02P 5/15*     (2006.01)

(52) U.S. Cl.
    CPC .............. *F02D 41/38* (2013.01); *F02P 5/045* (2013.01); *F02P 5/1502* (2013.01); *F02D 2200/501* (2013.01)

FIG. 3

|  | IVO | IVC | EVO | EVC | Valve overlap |
|---|---|---|---|---|---|
| IGNITION TIMING RETARDATION | -6 | 142 | -189 | 5 | 11 (Positive) |
| EVO RETARDATION | 9 | 133 | -189 ~ -144 | -10 | -19 (Negative) |

ENGINE CONTROL SYSTEM PROVIDED WITH DUAL CONTINUOUSLY VARIABLE VALVE DURATION DEVICE AND METHOD OF GPF FORCIBLE REGENERATION USING THE SAME

CROSS-REFERENCE TO RELATED APPLICATION

This application claims priority to and the benefit of Korean Patent Application No. 10-2023-0160995 filed in the Korean Intellectual Property Office on Nov. 20, 2023, the entire contents of which are incorporated herein by reference.

BACKGROUND OF THE INVENTION

(a) Field of the Invention

The present disclosure relates to a method for the forcible regeneration of a gasoline particulate filter (GPF) using an engine control system equipped with a dual continuously variable valve duration device. More particularly, it concerns an engine control method in which exhaust duration of an engine is adjusted to thus increase an exhaust gas temperature under a negative valve overlap condition, thereby forcing GPF regeneration and reducing emissions (EM) in the exhaust gas.

(b) Description of the Related Art

In general, an internal combustion engine generates power by receiving fuel and air in a combustion chamber and causing them to combust. During air intake, the engine operates an intake valve by driving a camshaft, allowing air to enter the combustion chamber while the intake valve is opened. In addition, the engine operate an exhaust valve by driving the camshaft, allowing exhaust gas to exit the combustion chamber while the exhaust valve is opened.

However, an optimal intake/exhaust valve operation can vary depending on an engine rotation speed. That is, an appropriate lift or valve opening/closing time can vary depending on the engine rotation speed. In order to implement the appropriate valve operation based on the engine rotation speed in this way, the plurality of cams for driving the valves may be designed or a continuous variable valve lift (CVVL) device is being studied that allows the valve to be operated at a different lift based on the engine rotation speed.

Additionally, a continuous variable valve timing (CVVT) technology has been developed to adjust a valve opening time, which is a technology of simultaneously changing valve opening/closing timings while valve duration is fixed.

In recent years, a continuous variable valve duration (CVVD) technology of adjusting a valve opening period (that is, the valve duration) based on a driving condition of a vehicle has been developed and has been applied to the vehicle.

Meanwhile, a technology of physically collecting particulate matters (PMs) exhausted from the engine by installing a gasoline particulate filter (GPF) has been applied to the vehicle.

Combustion of soot deposited in the filter is closely related to an exhaust gas temperature. That is, the higher the exhaust gas temperature and the higher oxygen concentration, increase the exhaust gas combustion speed.

In a case of the GPF mounted on a gasoline engine, the exhaust gas temperature may be higher than that of a diesel engine. Therefore, when the vehicle is driven with the exhaust gas temperature is 600° C. or above, that is, a temperature sufficient to cause soot combustion a condition for natural combustion without separate post-injection may be provided. However, it is necessary to continuously maintain a high-temperature exhaust gas, and it may be difficult to further generate the soot combustion when a temperature change is severe.

Gasoline engines, on the other hand, may operate under a stoichiometric condition, and the oxygen concentration in the exhaust gas may thus be very low (in general, the exhaust gas has oxygen concentration of 1% to 1.5% under an A/F 14.7 (lambda 1) condition). Therefore, the oxygen concentration may be very low even when an exhaust gas temperature condition is favorable, the oxygen concentration remains very low, causing the combustion of soot deposited in the GPF to occur very slowly (i.e., at a very low combustion speed). As a result, during low-speed driving (e.g., city driving), soot from the engine may accumulate continuously in the filter due to low exhaust gas temperatures and low oxygen concentration. In this way, an amount of the deposited soot may exceed the filter's capacity, leading to potential filter damage due to rapid soot combustion during conditions such as high-speed fuel cut. The above information disclosed in this Background section is provided only to aid understanding of the present disclosure and may include information not known in prior art to those skilled in the field of the present disclosure.

SUMMARY OF THE INVENTION

The present disclosure provides an engine control method in which exhaust duration of an engine is adjusted using a dual continuously variable valve duration device to increase an exhaust gas temperature, thereby forcing regeneration a gasoline particulate filter (GPF) and reducing emissions (EM) included in the exhaust gas.

According to an embodiment, an engine control system is provided with a dual continuously variable valve duration device, the system including: an engine including a combustion chamber, an intake valve in the combustion chamber and selectively supplying a mixture of air and fuel to the combustion chamber, an ignition plug in the combustion chamber and causing mixture combustion, and an exhaust valve in the combustion chamber and selectively exhausting an exhaust gas in the combustion chamber externally from the combustion chamber; a dual continuously variable valve duration device adjusting intake duration of the intake valve and exhaust duration of the exhaust valve; a turbine located downstream of the engine, and allowing the exhaust gas exhausted from the engine to pass therethrough to be exhausted at a strong pressure by its rotation; a warm-up catalyst (WCC) located downstream of the turbine, and installed at an exhaust pipe to preheat the exhaust gas; a gasoline particulate filter (GPF) disposed at the rear of the warm-up catalyst, and installed at the exhaust pipe to filter out soot included in the exhaust gas; and a controller adjusting the ignition timing, intake duration, and exhaust duration of the ignition plug, based on a vehicle driving condition, wherein under the condition that lambda ($\lambda$) is 1, the controller adjusts the exhaust duration while to avoid overlap with the intake valve opening (IVO) timing by retarding exhaust valve opening (EVO) timing and advancing exhaust valve closing (EVC) timing, and performs control to maintain intake valve closing (IVC) timing to ensure a negative valve overlap period The exhaust valve opening (EVO) timing retardation may range from −189° to −144° based on a top dead center (TDC).

The exhaust valve closing (EVC) timing advancement may be set to −10° based on top dead center (TDC).

During an exhaust valve opening timing retardation period, a temperature increase of the warm-up catalyst at the rear of the turbine may be 69° C.

Under the condition that lambda (λ) equals 1, a minimum temperature required for GPF regeneration may be 600° C.

During an exhaust valve opening timing retardation period, a coefficient of variation (CoV) of an indicated mean effective pressure (IMEP) may be 2% or less.

During an exhaust valve opening timing retardation period, brake specific fuel consumption (BSFC) may increase from 245 g/kWh to 272 g/kWh.

According to an embodiment, a method is provided for gasoline particulate filter (GPF) forcible regeneration using an engine control system provided with a dual continuously variable valve duration device, the method including: starting a vehicle; determining, by a controller, whether an accumulated driving distance (or odometer (ODO)) is more than a mileage set value, and an engine coolant temperature is less than a temperature set value; determining, by the controller, a time required for the GPF forcible regeneration if the accumulated driving distance is more than the mileage set value, and the engine coolant temperature is less than the temperature set value; determining, by the controller, whether a vehicle speed is more than a speed set value and a real-time torque model value is more than a torque set value; performing, by the controller, exhaust valve opening (EVO) retardation control and fuel rich (A/F Rich) injection when it is determined that the vehicle speed is more than the speed set value and the real-time torque model value is more than the torque set value; performing, by the controller, the GPF forcible regeneration by performing fuel cut or fuel lean (A/F lean) injection; determining, by the controller, whether an accumulated time for the GPF forcible regeneration is more than a time required for the forcible regeneration; and ending, by the controller, the forcible regeneration and returning to normal operation if the accumulated time for the GPF forcible regeneration is more than the time required for the forcible regeneration.

The accumulated time for the GPF forcible regeneration may be determined based on an amount of oxygen supplied in an exhaust gas supplied to a GPF and an exhaust gas temperature.

The amount of oxygen supplied in the exhaust gas supplied to the GPF and the exhaust gas temperature may be determined by the revolutions per minute (RPM) and torque of an engine.

The amount of oxygen supplied in the exhaust gas supplied to the GPF and the exhaust gas temperature may vary based on exhaust valve opening (EVO) timing.

As set forth above, according to an embodiment of the present disclosure, it is possible to adjust the exhaust duration of the engine to increase the exhaust gas temperature. In this case, the three-way catalyst disposed downstream of the engine may quickly heat up and reach the activation temperature. Therefore, the warm-up time of the three-way catalyst may be reduced, thereby reducing the amount of emissions.

In addition, according to an embodiment, it is possible to adjust the exhaust duration of the engine to increase exhaust gas temperature under the negative valve overlap condition, thereby forcing regeneration of the gasoline particulate filter (GPF).

BRIEF DESCRIPTION OF THE DRAWINGS

FIG. 3 is a table showing valve timing compared to ignition timing retardation, with the valve timing including exhaust valve opening (EVO) timing retardation and exhaust valve closing (EVC) timing advancement in the engine control system according to an embodiment of the present disclosure.

Figure 1:
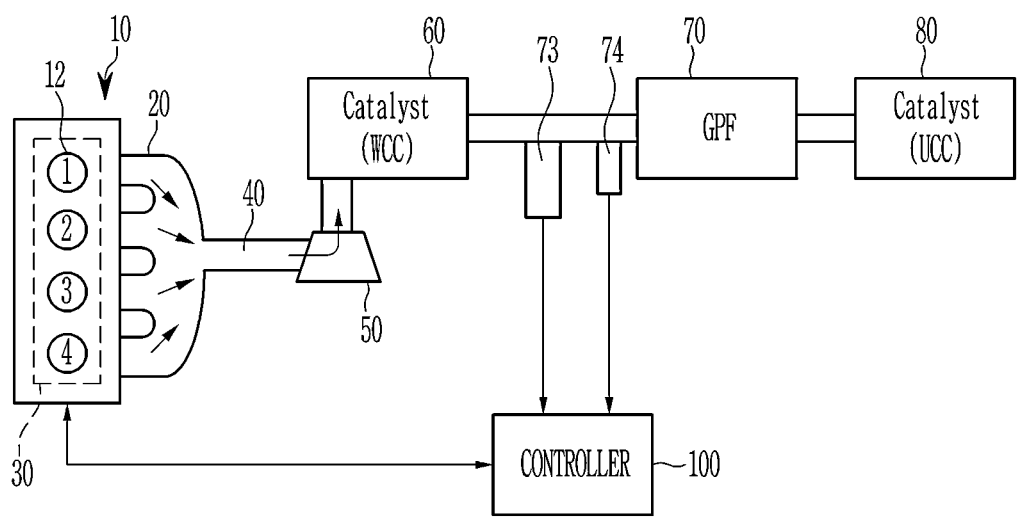
FIG. 1 is a configuration diagram of an engine control system according to an embodiment of the present disclosure.

It should be understood that the drawings referenced above are not necessarily drawn to scale, and present a simplified representation of preferred features showing the basic principles of the present disclosure. For example, specific design features of the present disclosure, including specific dimensions, orientation, position and shape, are determined in part by the particular intended application and environment of use.

DETAILED DESCRIPTION OF THE EMBODIMENTS

Terms used in the specification are provided solely to describe specific embodiments of the present disclosure, and are not intended to limit the present disclosure. Terms in singular form used in the specification are intended to include their plural forms unless the context clearly indicates otherwise. It is to be understood that the terms "include" or "have" used in the specification specify the presence of features, numerals, steps, operations, elements and/or components, and do not preclude the presence or addition of other features, numerals, steps, operations, components and/or groups thereof. The term "and/or" used herein includes any or all combinations of the associated listed items. A term "coupled" used herein indicates a physical relationship between two components directly connected to each other, or indirectly connected to each other through one or more intermediate components.

In general, a "vehicle", "of the vehicle", a "car" or other similar terms used in the specification may be understood to include passenger automobiles including a sport utility vehicle (SUV), a bus, a truck, and various commercial vehicles, vessels including various boats and ships, and a motor vehicle such as an aircraft, and include a hybrid vehicle, an electric vehicle, a plug-in hybrid vehicle, a hydrogen-powered vehicle, and another alternative fuel (e.g., fuel derived from a source other than petroleum) vehicle.

Further, it is to be understood that one or more of the methods described below or aspects thereof may be executed by at least one or more controllers. The term "controller" may refer to a hardware device comprising a memory and a processor. The memory may store program instructions, and the processor may be specifically programmed to execute the program instructions to perform one or more processes described below in more detail. Furthermore, the methods below may be executed by a system that includes the controller, as described in more detail below.

In addition, the controller in the specification may be implemented as a non-transitory computer-readable medium including executable program instructions executed by the processor or similar components. Examples of the computer-readable medium may include a read only memory (ROM), a random access memory (RAM), a compact disk read only memory (CD-ROM), a magnetic tape, a floppy disk, a flash drive, a smart card, or an optical data storage device, however the present disclosure is not limited thereto. The computer-readable medium may also be distributed over a computer network so that the program instructions can be distributed, stored, or executed, for example, by a telematics server or a controller area network (CAN).

Hereinafter, embodiments of the present disclosure are described in detail with reference to the accompanying drawings.

Figure 2:
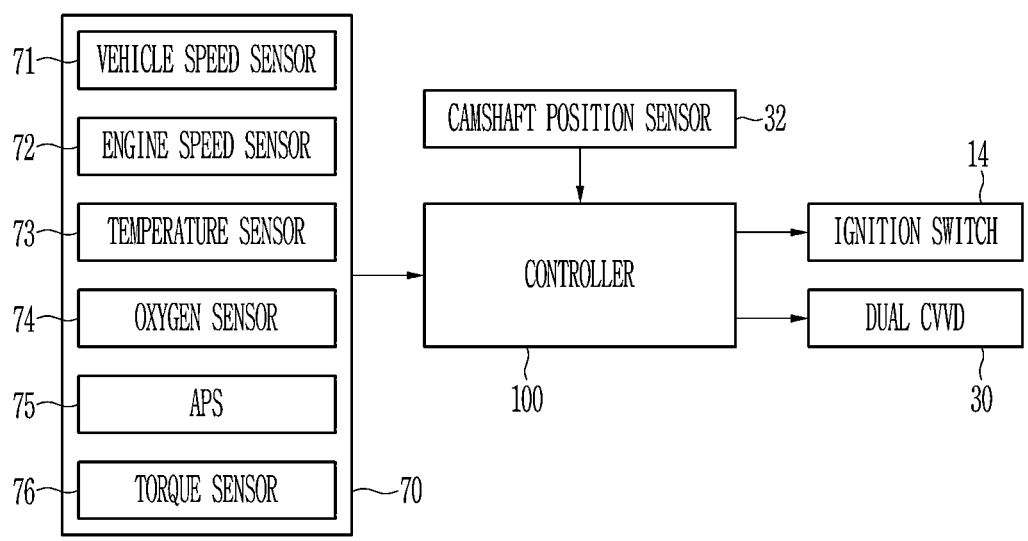
FIG. 2 is a block diagram of the engine control system according to an embodiment of the present disclosure.

FIG. 1 is a configuration diagram of an engine control system according to an embodiment of the present disclosure, and FIG. 2 is a block diagram of the engine control system according to an embodiment of the present disclosure.

As shown in FIG. 1, the engine control system according to an embodiment of the present disclosure may include an engine 10, a dual continuously variable valve duration (CVVD) device 30, a turbine 50, a warm-up catalyst (WCC) 60, a gasoline particulate filter (GPF) 70, and a controller 100.

The engine 10 may convert chemical energy into mechanical energy through combustion of a fuel-air mixture. The engine 10 may include a plurality of combustion chambers 12. An intake valve, an ignition plug, an exhaust valve, an injector, or similar components may be installed in the combustion chamber 12, and the mixture combusted in the combustion chamber 12 may be exhausted through an exhaust manifold 20.

The combustion chamber 12 may be connected to an intake manifold and receive air or a mixture of air and fuel. An intake port may be formed in the combustion chamber 12, and the intake valve may be installed in the intake port. The intake valve may be operated by rotation of a camshaft connected to a crankshaft thereby opening or closing the intake port. When the intake valve opens the intake port, air or the mixture from the intake manifold may flow into the combustion chamber 12 through the intake port, and when the intake valve closes the intake port, air or the mixture from the intake manifold may not flow into the combustion chamber 12. In addition, the combustion chamber 12 may be connected to the exhaust manifold 20, and exhaust gas generated during combustion may be collected in the exhaust manifold 20 and then flow to an exhaust pipe 40. An exhaust port may be formed in the combustion chamber 12, and with the exhaust valve installed in the exhaust port. The exhaust valve may also be operated by rotation of the camshaft connected to the crankshaft thereby opening or closing the exhaust port. When the exhaust valve opens the exhaust port, the exhaust gas in the combustion chamber 12 may flow to the exhaust manifold 20 through the exhaust port, and when the exhaust valve closes the exhaust port, the exhaust gas in the combustion chamber 12 cannot flow into the exhaust manifold 20.

Among engine types, for example, in a case of a gasoline direct injection engine, the injector may be mounted in the combustion chamber 12 to inject the fuel into the combustion chamber 12. In addition, in a gasoline engine, the ignition plug may be provided at the top of the combustion chamber 12 to ignite the mixture in the combustion chamber 12.

The dual CVVD device 30 may be mounted at the top of the engine 10, and adjust intake valve duration and exhaust valve duration. The dual CVVD device 30 may include an intake CVVD device variably adjusting the valve duration of the intake valve and an exhaust CVVD device variably adjusting the valve duration of the exhaust valve, which are integrated with each other. The dual CVVD device 30 may utilize various CVVD devices such as the CVVD device disclosed in Korean Patent No. 1619394, the entire content of which is incorporated by reference in this specification. Additionally, it should be understood that the dual CVVD device 30 may utilize various CVVD devices known to date in addition to the CVVD device disclosed in Korean Patent No. 1619394, and the CVVD device in embodiments of the present disclosure is not limited to that disclosed in Korean Patent No. 1619394. Here, the intake valve duration may be referred to as "intake duration". The intake duration may be defined as a period from the timing at which the intake valve opens to the timing at which it closes. In addition, the timing at which the intake valve opens may be referred to as intake valve opening (IVO) timing, and the timing at which the intake valve closes may be referred to as intake valve closing (IVC) timing. Therefore, the intake duration may be a period from the IVO timing to the IVC timing.

In addition, the exhaust valve duration may here be referred to as "exhaust duration". The exhaust duration may be defined as a period from timing at which the exhaust valve is opened to timing at which the exhaust valve is closed. In addition, the timing at which the exhaust valve opens may be referred to as exhaust valve opening (EVO) timing, and the timing at which the exhaust valve closes may be referred to as exhaust valve closing (EVC) timing. Therefore, the exhaust duration may be a period from the EVO timing to the EVC timing.

The exhaust pipe 40 may be connected to the exhaust manifold 20 and the exhaust gas externally from the vehicle. Various catalyst converters may be mounted at the exhaust pipe 40 to remove emissions included in the exhaust gas.

The turbine 50 may allow the exhaust gas at the rear of the engine 10 to pass through, exhausting it at high pressure by its rotation.

The warm-up catalyst 60 may be disposed at the rear of the turbine 50, and installed on the exhaust pipe 40 to preheat the exhaust gas. The warm-up catalyst 60 may be designed to increase the exhaust gas temperature in a short time. The exhaust gas may increase in temperature as it passes through the warm-up catalyst 60, and be transmitted to a main catalyst means (not shown), thus shortening its time to reach an appropriate temperature. Accordingly, the main catalyst means may fully function even in early stages of engine 10 operation, thus doubling gas purification efficiency of the exhaust gas.

The gasoline particulate filter 70 may be located at the rear of the warm-up catalyst 60, and installed on the exhaust pipe 40 to filter out soot included in the exhaust gas. The exhaust gas exhausted from the engine 10 may pass through the warm-up catalyst 60 and then enter the gasoline particulate filter 70 through the exhaust pipe 40, and the gasoline particulate filter 70 may filter the exhaust gas. The filtered exhaust gas may then be exhausted through the exhaust pipe 40, which is connected to the rear of the gasoline particulate filter 70. The gasoline particulate filter 70 may be connected to the controller to control an operation of the engine control system.

A plurality of sensors 71, 72, 73, 74, 75, 76, and 32 may be mounted on the vehicle and the exhaust pipe 40, to detect vehicle and combustion states. The temperature sensor 73 may be mounted on the exhaust pipe 40 at the rear of the turbine 50 and the warm-up catalyst 60 and in the front of the gasoline particulate filter 70, and detect the exhaust gas temperature at the rear of the turbine 50 and the warm-up catalyst 60 and transmit a signal corresponding thereto to the controller 100.

The oxygen sensor 74 may be mounted on the exhaust pipe 40 at the rear of the turbine 50 and the warm-up catalyst 60 and in the front of the gasoline particulate filter 70, detecting the concentration of oxygen in the exhaust gas at the rear of the turbine 50 and the warm-up catalyst 60 and transmit a signal corresponding thereto to the controller 100.

As shown in FIG. 2, the engine control system may also include the vehicle speed sensor 71, the engine speed sensor 72, the accelerator position sensor (APS) 75, the torque sensor 76, and the camshaft position sensor 32.

The vehicle speed sensor 71 may detect a vehicle speed and transmit a corresponding signal to the controller 100, and may be mounted on a vehicle wheel.

The engine speed sensor 72 may detect a speed of the engine 10 based on phase changes in the crankshaft or camshaft, and transmit a corresponding signal to the controller 100.

The accelerator position sensor (APS) 75 may detect a degree to which a driver presses an accelerator pedal. When the accelerator pedal is completely pressed, a position value of the accelerator pedal may be 100%, and in a case where the accelerator pedal is not completely pressed, a position value of the accelerator pedal may be 0%. The accelerator position sensor 75 may use a throttle position sensor (TPS) mounted in an intake passage instead of the APS.

The torque sensor 76 may measure a torque of the crankshaft for example, and transmit a corresponding signal to the controller 100.

The camshaft position sensor 32 may detect changes in the camshaft angle, and transmit a corresponding signal to the controller 100.

The controller 100 may adjust an operation of the turbine 50 and an operation of the dual CVVD device 30 based on the output signals of the various sensors to thus adjust the opening, closing, and duration of each of the intake valve and the exhaust valve.

Under a condition where lambda ($\lambda$) is 1, the controller 100 may adjust the exhaust duration to prevent it from overlapping with the intake valve opening (IVO) timing by retarding the exhaust valve opening (EVO) timing, and advancing the exhaust valve closing (EVC) timing. In addition, the controller 100 may adjust the control to maintain the intake valve closing (IVC) timing to maintain a negative valve overlap period.

Figure 4:
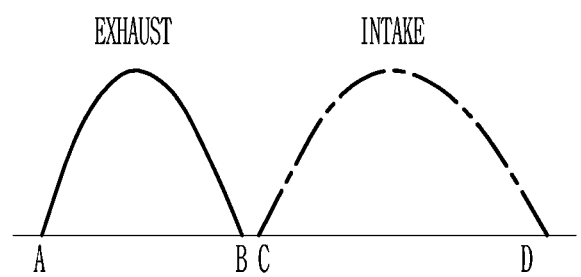
FIG. 4 is a table showing exhaust valve timing together with intake valve timing, with the exhaust valve timing including the EVO timing retardation and the EVC timing advancement in the engine control system according to an embodiment of the present disclosure.

FIG. 3 is a table showing valve timing compared to ignition timing retardation, the valve timing including exhaust valve opening (EVO) timing retardation and exhaust valve closing (EVC) timing advancement in the engine control system according to an embodiment of the present disclosure, and FIG. 4 is a table showing exhaust valve timing along with intake valve timing, the exhaust valve timing including the EVO timing retardation and the EVC timing advancement in the engine control system according to an embodiment of the present disclosure.

Referring to FIG. 3, a conventional ignition timing retardation strategy sets IVO timing of −6°, IVC timing of +142°, EVO timing of −189°, and the EVC timing of +5°, based on a top dead center (TDC). Here, an opening time of the exhaust valve and an opening time of the intake valve may overlap (or valve-overlap) by 11° between −6° and +5° based on the top dead center.

Meanwhile, the EVO retardation and EVC advancement strategies according to an embodiment of the present disclosure may set IVO timing at +9°, IVC timing of +133°, EVO timing retardation from −189° to −144°, and EVC timing advancement of −10°, based on top dead center.

In this case, as shown in FIG. 4, EVO timing A may be retarded and EVC timing B may be advanced, thus reducing the exhaust duration (or an interval between point A and point B). In addition, IVO timing C may occur after the EVC timing B, and the opening time of the exhaust valve and the opening time of the intake valve may not overlap (or negative overlap) each other.

In this case, the catalyst purification efficiency may be maintained because there is no change in a composition of the exhaust gas. However, fuel efficiency may be slightly decreased, and fuel cut or a lean operation may be required after a rich operation and an increase in exhaust temperature.

As the EVO timing is retarded, a back pressure in the combustion chamber 12 of the engine 10 may increase, resulting in a lower torque. It may be necessary to boost a supercharge pressure to maintain the same torque. Accordingly, an amount of air supplied to the engine may be increased (lean operation), thereby increasing the exhaust energy and the exhaust temperature in front of the GPF. In this case, ignition timing may be slightly retarded due to the increased air amount, while preventing lower combustion stability. In addition, the fuel efficiency may slightly decrease. However, the extent of the decrease may be less compared to that in the ignition timing retardation strategy.

Figure 5:
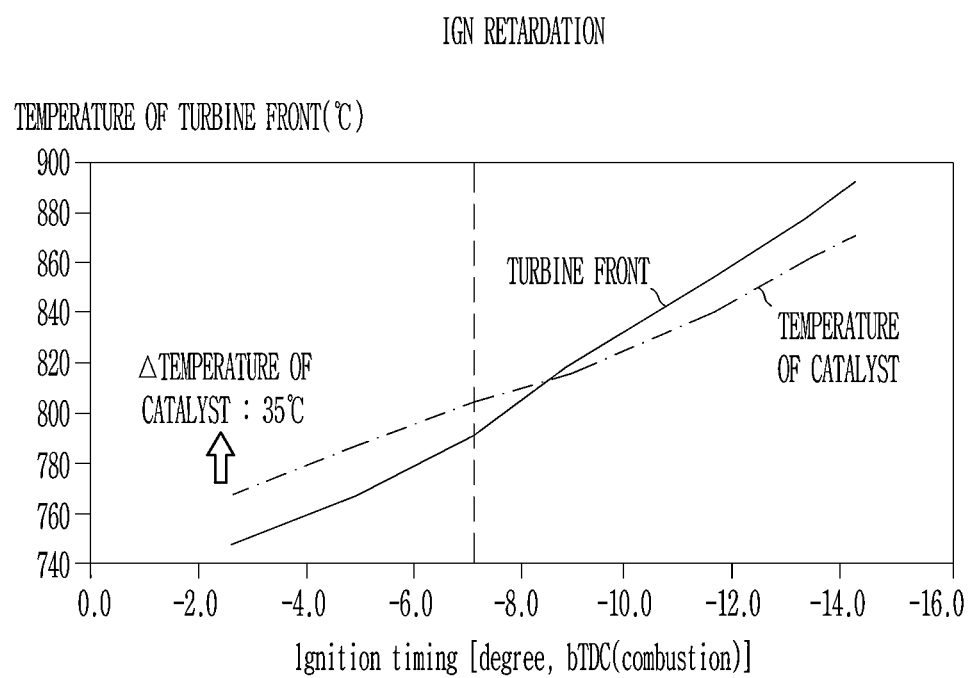
FIG. 5 is a graph showing temperature changes in a turbine front and a catalyst when applying a conventional ignition timing retardation.
Figure 6:
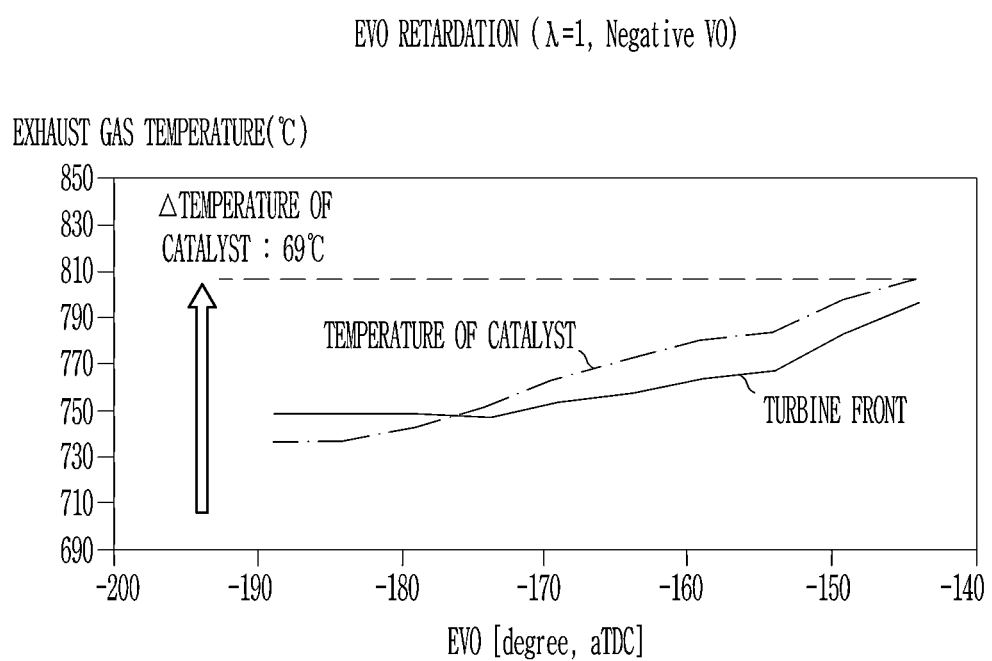
FIG. 6 is a graph showing temperature changes in a turbine front and a catalyst when applying the EVO timing retardation and the EVC timing advancement in the engine control system according to an embodiment of the present disclosure.

FIG. 5 is a graph showing temperature changes in a turbine front and the catalyst when applying the conventional ignition timing retardation, and FIG. 6 is a graph showing temperature changes in a turbine front and a catalyst when applying the EVO timing retardation and the EVC timing advancement in the engine control system according to an embodiment of the present disclosure.

Referring to FIG. 5, when applying the ignition timing retardation, the ignition timing retardation may be set to about −3.0° to about −14.0°, and a temperature increase of the warm-up catalyst 60 may be about 35° C., excluding areas where ignition timing retardation is set to about −7.0° or more, which is an inapplicable area due to combustion instability.

Referring to FIG. 6, when applying the EVO timing retardation and the EVC timing advancement, the EVO timing retardation may be set to −189° to −144° based on the top dead center (TDC), and the EVC timing advancement may be set to −10°. During an EVO timing retardation period, a temperature increase of the warm-up catalyst 60 may be about 69° C.

During an exhaust valve opening timing retardation period, a coefficient of variation (CoV) of an indicated mean effective pressure (IMEP) at the rear of the turbine 50 may be set to about 2% or less.

It may be observed that the temperature of the warm-up catalyst 60 may be increased to a greater extent under a stable combustion condition when applying the EVO retardation strategy compared to the ignition timing retardation strategy which is a conventional temperature increase strategy.

Figure 7:
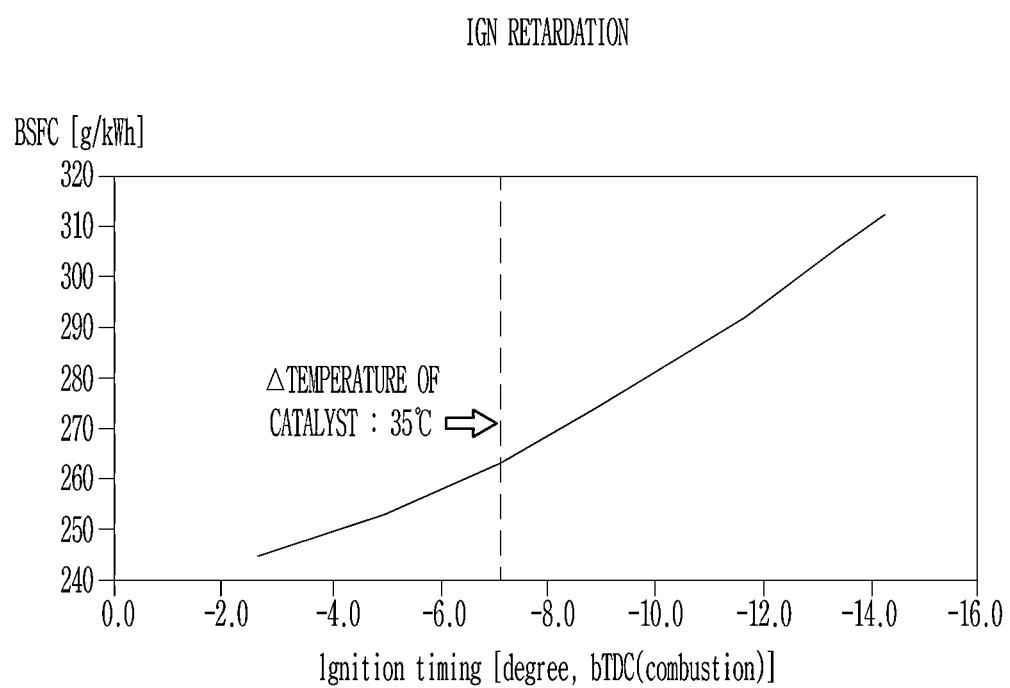
FIG. 7 is a graph showing changes in brake specific fuel consumption (BSFC) when applying the conventional ignition timing retardation.
Figure 8:
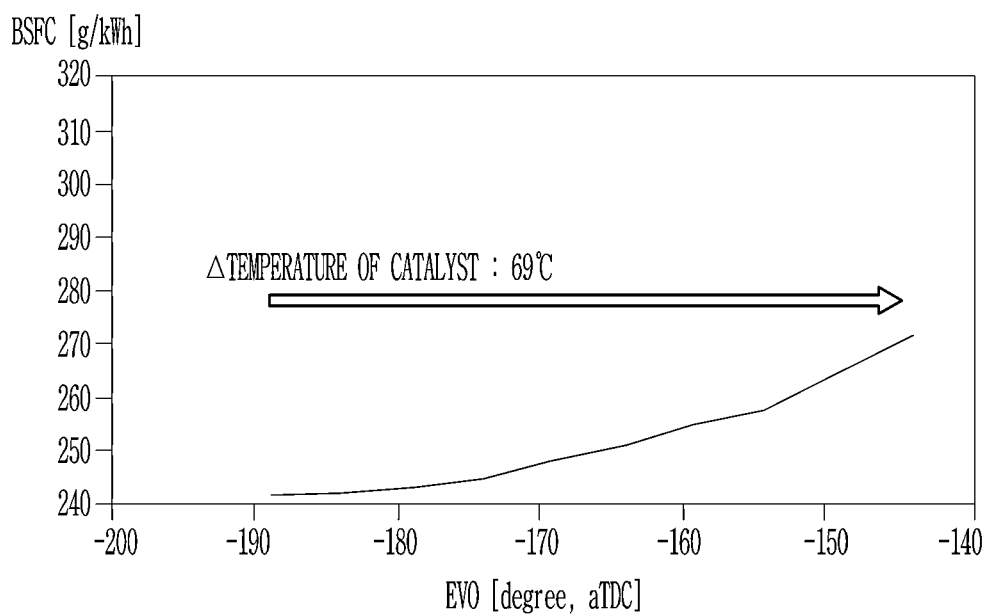
FIG. 8 is a graph showing changes in BSFC when applying the EVO timing retardation and the EVC timing advancement in the engine control system according to an embodiment of the present disclosure.

FIG. 7 is a graph showing changes in brake specific fuel consumption (BSFC) when applying the conventional ignition timing retardation, and FIG. 8 is a graph showing changes in BSFC when applying the EVO timing retardation and the EVC timing advancement in the engine control system according to an embodiment of the present disclosure.

Referring to FIG. 7, when applying the conventional ignition timing retardation, the brake specific fuel consumption (BSFC) may increase from about 245 g/kWh to about 310 g/kWh. However, as shown in FIG. 8, when applying the EVO timing retardation and the EVC timing advancement in the engine control system according to an embodiment of the present disclosure, the BSFC may be only increased from about 245 g/kWh to about 272 g/kWh. Therefore, under conditions where lambda (λ) is 1, it is possible to secure the combustion stability, minimize the decrease in the fuel efficiency, and increase the exhaust gas temperature.

Figure 9:
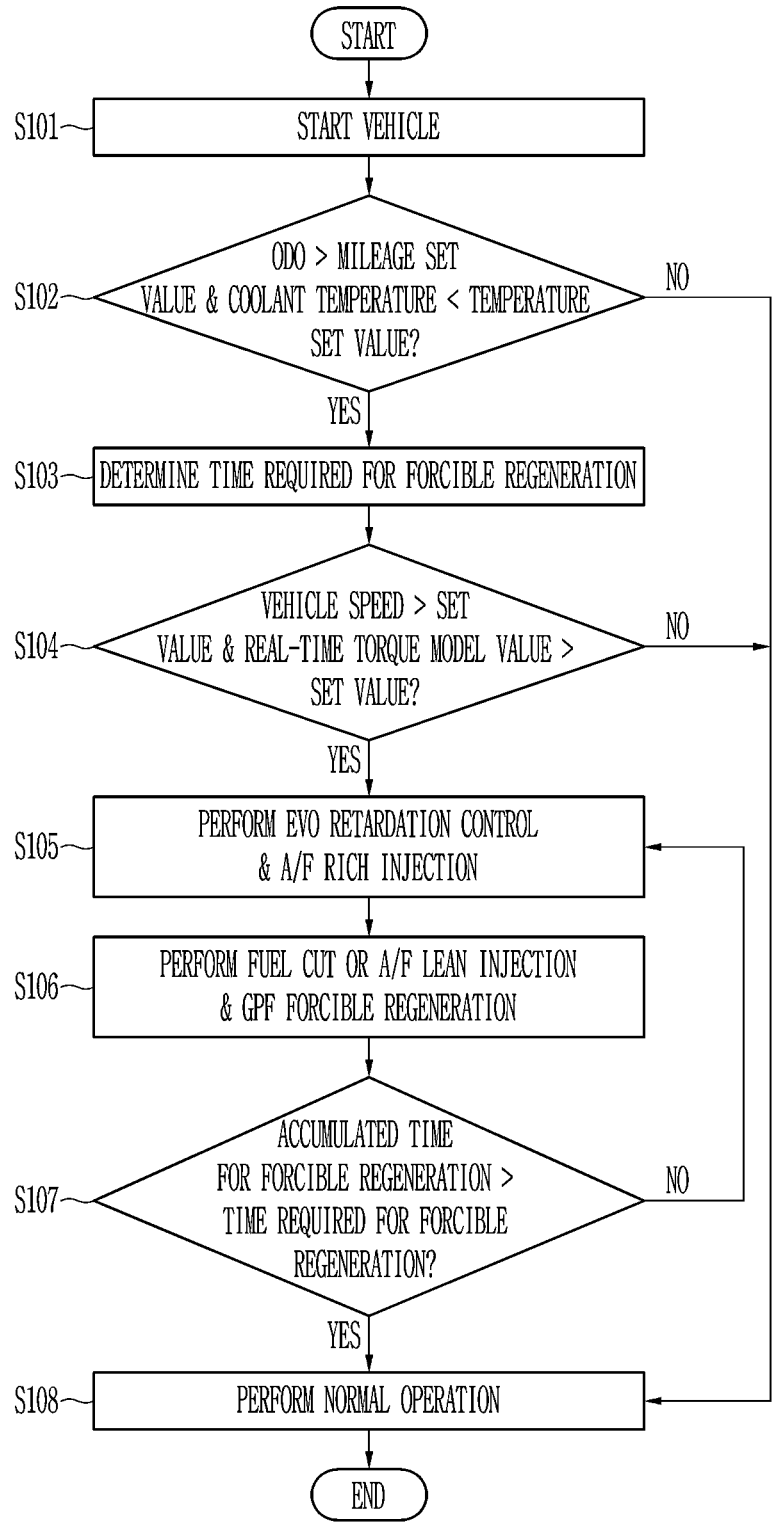
FIG. 9 is a flowchart showing a method for GPF forcible regeneration using an engine control system according to an embodiment of the present disclosure.

FIG. 9 is a flowchart showing a method for gasoline particulate filter (GPF) forcible regeneration using an engine control system according to an embodiment of the present disclosure.

Referring to FIG. 9, in the method for GPF forcible regeneration using an engine control system according to an embodiment of the present disclosure, the vehicle may first be started and driven (S101). The controller may then determine whether an accumulated driving distance (or odometer (ODO)) of the vehicle is greater than a set mileage value, and whether an engine coolant temperature is below a set temperature value (S102).

The controller may determine a time required for the GPF forcible regeneration (S103) when determining that the accumulated driving distance (or odometer (ODO)) is more than the mileage set value and the engine coolant temperature is less than the temperature set value.

The controller may then determine whether the vehicle speed exceeds a set speed value and a real-time torque model value is more than a torque set value (S104).

The controller may then perform exhaust valve opening (EVO) retardation control and fuel rich (A/F Rich) injection (S105) when determining that the vehicle speed is more than the speed set value and the real-time torque model value is more than the torque set value.

The controller may perform the GPF forcible regeneration by executing a fuel cut or fuel lean (A/F lean) injection (S106).

The controller may then determine whether an accumulated time for the GPF forcible regeneration exceeds the time required for forcible regeneration (S107).

The controller may then end the forcible regeneration and resume a normal operation (S108) when determining that the accumulated time for the GPF forcible regeneration is more than the time required for the forcible regeneration.

The controller 100 may be electrically connected to the sensors 71, 72, 73, 74, 75, 76, and 32, receive the corresponding signals, and determine vehicle driving condition, such as the accumulated driving distance (or odometer (ODO)), the engine coolant temperature, the vehicle speed, the torque model value, and the accumulated time for the GPF forcible regeneration, based on the signals. The controller 70 may control at least one of the ignition timing, intake duration, and exhaust duration of an ignition plug 14, based on the determination. The controller 70 may be implemented as at least one processor operating based on a set program, and the set program may be configured to perform each step of an engine control method according to an embodiment of the present disclosure.

Meanwhile, the accumulated time for the GPF forcible regeneration may be determined based on an amount of oxygen supplied in the exhaust gas supplied to the GPF and the exhaust gas temperature. In addition, the amount of oxygen supplied in the exhaust gas supplied to the GPF and the exhaust gas temperature may be determined by the revolutions per minute (RPM) and torque of the engine. In addition, the amount of oxygen supplied in the exhaust gas supplied to the GPF and the exhaust gas temperature may vary based on the exhaust valve opening (EVO) timing.

As described above, in an embodiment of the present disclosure, it is possible to adjust the exhaust duration of the engine to thus increase the exhaust gas temperature. In this case, the three-way catalyst located downstream of the engine may be quickly heated and may quickly reach the activation temperature. Therefore, the warm-up time of the three-way catalyst may be reduced, thereby decreasing emissions.

In addition, according to an embodiment, it is possible to adjust the exhaust duration of the engine to increase the exhaust gas temperature under the negative valve overlap condition, thereby forcing regeneration the gasoline particulate filter (GPF).

Although the embodiments of the present disclosure have been described above, the scope of the present disclosure is not limited thereto, and all equivalent modifications easily made by those skilled in the art to which the present disclosure pertains are intended to fall within the scope and spirit of the present disclosure.

DESCRIPTION OF SYMBOLS

10: engine
12: combustion chamber
20: exhaust manifold
30: dual continuously variable valve duration device
40: exhaust pipe
50: turbine
60: warm-up catalyst (WCC)
70: gasoline particulate filter (GPF)
80: UCC catalyst
100: controller

What is claimed is:

1. A method of gasoline particulate filter (GPF) forcible regeneration using an engine control system provided with a dual continuously variable valve duration device, the method comprising:
   starting a vehicle;
   determining, by a controller, whether an accumulated driving distance (or odometer (ODO)) is greater than a mileage set value, and an engine coolant temperature is less than a temperature set value;

determining, by the controller, a time required for the GPF forcible regeneration in response to determining when it is determined that the accumulated driving distance is greater than the mileage set value, and the engine coolant temperature is less than the temperature set value;

determining, by the controller, whether a vehicle speed is greater than a speed set value and a real-time torque model value is greater than a torque set value;

performing, by the controller, exhaust valve opening (EVO) retardation control and fuel rich (A/F Rich) injection in response to determining that the vehicle speed is greater than the speed set value and the real-time torque model value is greater than the torque set value;

performing, by the controller, the GPF forcible regeneration by performing fuel cut or fuel lean (A/F lean) injection;

determining, by the controller, whether an accumulated time for the GPF forcible regeneration is greater than a time required for the forcible regeneration; and ending, by the controller, the forcible regeneration and performing a normal operation in response to determining that the accumulated time for the GPF forcible regeneration is greater than the time required for the forcible regeneration.

2. The method of claim 1, wherein
the accumulated time for the GPF forcible regeneration is determined based on an amount of oxygen supplied in an exhaust gas supplied to a GPF and an exhaust gas temperature.

3. The method of claim 2, wherein
the amount of oxygen supplied in the exhaust gas supplied to the GPF and the exhaust gas temperature are determined by revolutions per minute (RPM) and torque of an engine.

4. The method of claim 3, wherein
the amount of oxygen supplied in the exhaust gas supplied to the GPF and the exhaust gas temperature are changed based on an exhaust valve opening (EVO) timing.

* * * * *